D. PLATTNER.
LEVER MECHANISM FOR SWEEP RAKES.
APPLICATION FILED NOV. 9, 1908.
915,040.
Patented Mar. 9, 1909.
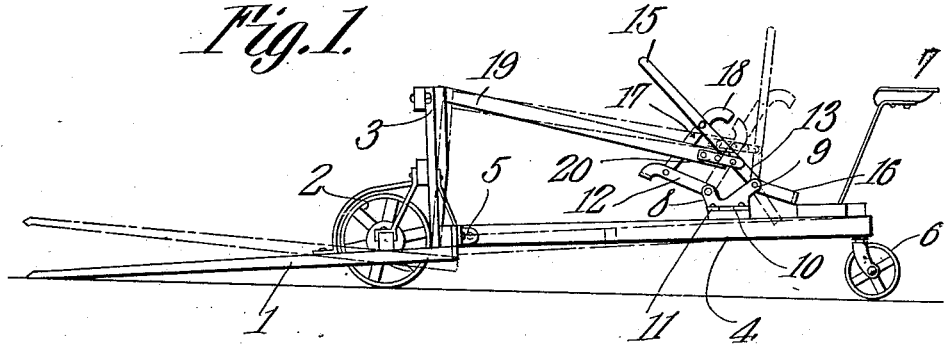
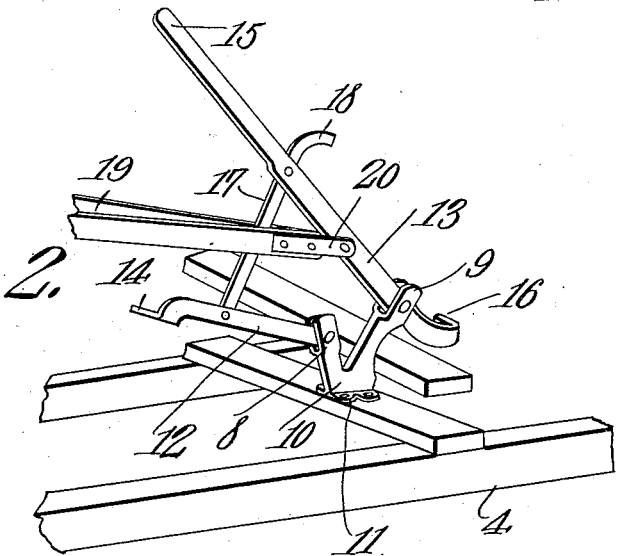
Witnesses
Inventor
David Plattner
By C. A. Snow & Co.
Attorneys

UNITED STATES PATENT OFFICE.

DAVID PLATTNER, OF DENVER, COLORADO.

LEVER MECHANISM FOR SWEEP-RAKES.

No. 915,040.          Specification of Letters Patent.          Patented March 9, 1909.

Original application filed January 29, 1906, Serial No. 298,500. Divided and this application filed November 9, 1908. Serial No. 461,759.

*To all whom it may concern:*

Be it known that I, DAVID PLATTNER, a citizen of the United States, residing at Denver, in the county of Denver and State of Colorado, have invented a new and useful Lever Mechanism for Sweep-Rakes, of which the following is a specification.

This invention has relation to lever mechanism for sweep-rakes and it consists in the novel construction and arrangement of its parts, as hereinafter shown and described.

The object of the invention is to provide an improved adjusting lever mechanism, the parts of which constitute a lock whereby the tines or teeth of a sweep rake may be supported at their pointed ends in tilted or upwardly disposed position.

In the accompanying drawings Figure 1 is a side elevation of a sweep rake with the lever mechanism applied thereto. Fig. 2 is a perspective view of the lever mechanism.

The rake 1, is of the usual construction and is mounted upon the wheels 2. The said rake is provided at its rear edge with the upwardly disposed frame 3. The frame 4, is pivotally connected at its forward end, as at 5, with the rear edge of the body of the rake 1, and the rear end portion of the frame 4 is supported upon the ground wheels 6. The operator's seat 7, is mounted upon the frame 4. The mechanism for adjusting the rake head and for locking or securing the same when the points of the rake are tilted upward for transportation and otherwise, is located directly in front of the operator's seat 7. Said mechanism includes a pair of forwardly and rearwardly divergent uprights 8 and 9, which may, and preferably do, form integral parts of a single casting 10, which is provided with apertured lugs 11, for the reception of bolts or other means whereby it may be secured to the frame 4. Upon the uprights 8 and 9 are pivoted levers 12 and 13; the extremities of the uprights being preferably bifurcated for the reception of said levers. The lever 12 which is pivoted upon the upright 8, is shorter than the lever 13, and it is provided with a laterally extending lug or stop-member 14. The lever 13, which constitutes the main operating lever, is extended upwardly from its fulcrum to form a handle 15, and downwardly from its fulcrum to form a foot-piece or treadle 16, which latter is curved or cranked in a rearward direction. The levers 12 and 13 are connected with each other by means of a link 17, which is extended rearwardly from the lever 13 to form the handle 18. The lever 13 at a point intermediate its fulcrum and the point at which it is connected with the link 17, is connected with the upwardly extending frame of the rake-head by means of forwardly divergent connecting rods or bars 19, which are preferably connected with the lever by means of a strap 20.

By the construction and arrangement of parts, as described, it will be seen that when the lever 13 is thrown in a forward direction, as shown in the heavy lines in Fig. 1, the pointed ends of the tines or teeth of the rake 1 will be dropped, the rake-head being tilted in a forward direction. This is the position assumed by the rake while the load is being gathered. When in this position, if an obstruction should be encountered by the rake, there will be nothing to hinder the points from rising and clearing such obstruction. When a load has been accumulated, or when it is desired to adjust the rake-head to a non-gathering position, the free upper end of the lever 13 is moved rearwardly by the operator, who may place his foot upon the treadle 16, in order to throw his entire weight upon the lever. Draft will thus be exerted upon the connecting rod 19, and the lever 12 will rise until it passes into longitudinal alinement with the link 17, which latter will be engaged by the laterally extending lug 14, and thus lock the parts in adjusted position. When the handle end 15 of the lever 13 is swung to the rear, as indicated by the dotted lines in Fig. 1, the link 17 and the lever 12 assume longitudinal alinement and, combined, form a prop or lock to hold the lever 13 in its swung back position, and, in order to unlock or release the lever 13, the operator grasps the handle 18 of the link 17, and swings the said link upon its pivotal connection with the lever 13, so that the link 17 is moved out of longitudinal alinement with the lever 12, and thus the lever 13 is freed to swing forward.

The subject matter of the present invention is divided from the matter disclosed in my earlier application for patent, which eventuated into Patent No. 841,892, dated January 22nd, 1907.

Having described my invention, what I claim as new, and desire to secure by Letters Patent, is:—

1. In combination with a rake and a frame pivotally attached thereto, an operating mechanism comprising two levers fulcrumed at fixed points upon the frame, a link pivotally connecting the said levers together and adapted to swing in alinement with one of the levers and a rod connecting the other lever with the rake.

2. In combination with a rake and a frame pivotally connected thereto an adjusting lever mounted upon the frame, rods connecting said lever with the rake, an independently supported lever having a laterally extending lug, and a link connecting the levers and having an extending portion whereby it may be manipulated.

3. In combination with a rake and a frame pivotally connected thereto, an adjusting means including a base casting having divergent uprights, levers pivoted upon said uprights, one of the said levers being provided with a foot-piece and the other with a laterally extending lug, a link connecting said levers and adapted to be engaged by the laterally extending lug of one of the levers, said link having an extended portion whereby it may be manipulated, and a rod connecting the other lever with the rake.

In testimony that I claim the foregoing as my own, I have hereto affixed my signature in the presence of two witnesses.

DAVID PLATTNER.

Witnesses:
   FRED N. PLATTNER,
   W. W. GRISWOLD.